United States Patent
Beaven et al.

(10) Patent No.: US 9,818,369 B1
(45) Date of Patent: Nov. 14, 2017

(54) ENVIRONMENTAL DISPLAY

(71) Applicant: Xevo Inc., Kirkland, WA (US)

(72) Inventors: Travis Lee Beaven, Woodinville, WA (US); Christi Teresa McCorkle, Orlando, FL (US)

(73) Assignee: Xevo Inc., Kirkland, WA (US)

( * ) Notice: Subject to any disclaimer, the term of this patent is extended or adjusted under 35 U.S.C. 154(b) by 0 days.

(21) Appl. No.: 15/218,824

(22) Filed: Jul. 25, 2016

(51) Int. Cl.
*G09G 5/00* (2006.01)

(52) U.S. Cl.
CPC ....... *G09G 5/003* (2013.01); *G09G 2320/066* (2013.01); *G09G 2320/068* (2013.01); *G09G 2320/0626* (2013.01); *G09G 2370/02* (2013.01); *G09G 2380/06* (2013.01)

(58) Field of Classification Search
CPC ........... G09G 5/003; G09G 2320/0626; G09G 2380/06; G09G 2370/02; G09G 2320/068; G09G 2320/066
See application file for complete search history.

(56) References Cited

U.S. PATENT DOCUMENTS

| | | | |
|---|---|---|---|
| 9,047,054 B1 | 6/2015 | Goldstein et al. | |
| 2010/0253541 A1* | 10/2010 | Seder | G01S 13/723 340/905 |
| 2011/0258049 A1* | 10/2011 | Ramer | G06F 17/30867 705/14.66 |
| 2014/0306980 A1* | 10/2014 | Won | H04M 1/72544 345/589 |

* cited by examiner

*Primary Examiner* — Muhammad N Edun
(74) *Attorney, Agent, or Firm* — Seed IP Law Group LLP

(57) ABSTRACT

Briefly stated, embodiments are directed towards providing a smart sign that utilizes third-party environmental data to modify its displayed content and display settings. The environmental data includes a current position of the sun, the smart sign's position, weather conditions, and positional data of objects that are in proximity of the smart sign. Positional relationships of the sun and the objects relative to the smart sign are determined based on the positional data of the smart sign, the position of the sun, and the position of the proximity objects. A display change condition is generated based on a combination of the third-party weather conditions and the determined positional relationships of the smart sign, the sun, and the objects in the proximity of the smart sign. The displayed content and at least one display setting of the smart sign are modified based on the display change conditions.

20 Claims, 6 Drawing Sheets

ENVIRONMENTAL DISPLAY

BACKGROUND

Technical Field

The present disclosure relates generally to the dynamic, real-time adjustment of displayed content and display settings of a smart sign based on information associated with the environment conditions at the sign.

Description of the Related Art

Electronic display signs are quickly replacing traditional posters and billboards as the primary way to provide information to people. Many new malls, stores, airports, stadiums, arenas, sporting venues, zoos, amusement parks, and other public places are being equipped with electronic display signs rather than relying on traditional posters and billboards to convey information to the public. These electronic display signs allow an advertiser or merchant to change the information that is being displayed from week-to-week, day-to-day, or even hour-to-hour. But many of these signs are outside or in locations where the viewed content is impacted by the sun's intensity or lack thereof. It is with respect to these and other considerations that the embodiments described herein have been made.

BRIEF SUMMARY

Briefly stated, embodiments are directed towards providing a smart sign that utilizes third-party environmental data to modify its displayed content and modify its display settings to make the displayed content more visible to a viewer. The environmental data includes a plurality of different types of information that indicate what the current environmental conditions are at the smart sign without the use of physical sensors on the smart sign. The environmental data can include a current time of day for the smart sign, which is utilized to determine a current position of the sun; positional data of the smart sign, including a display direction of the smart sign; current or forecast weather conditions at the smart sign; or other environmental information. For example, in some embodiments, the environmental data may include an indication of objects that are in proximity of the smart sign by being within a predetermined distance from the smart sign. These objects may be objects that are positioned between the smart sign and the position of the sun. Positional relationships of the sun and the objects relative to the display direction of the smart sign are determined based on the positional data of the smart sign, the position of the sun at the current time of day, and the position of the objects within the predetermined distance from the smart sign.

A display change condition is generated based on a combination of the current or forecast weather conditions and the determined positional relationships of the smart sign, the sun, and the objects in the proximity of the smart sign. The displayed content is modified based on the display change condition. In some embodiments, the content may be modified by adding other content to the displayed content, replacing the displayed content with other content, or changing a visual characteristic of the displayed content. At least one display setting of the smart sign, such as brightness or contrast, is also modified in response to the display change condition. By changing the content and the display settings of the smart sign, the smart sign can adjust itself to display content that is more apparent, visible, and clear to viewers of the smart sign. In some embodiments, a motor is initiated to modify the display direction of the smart sign based on the display change condition, which can further improve the viewability of the smart sign.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
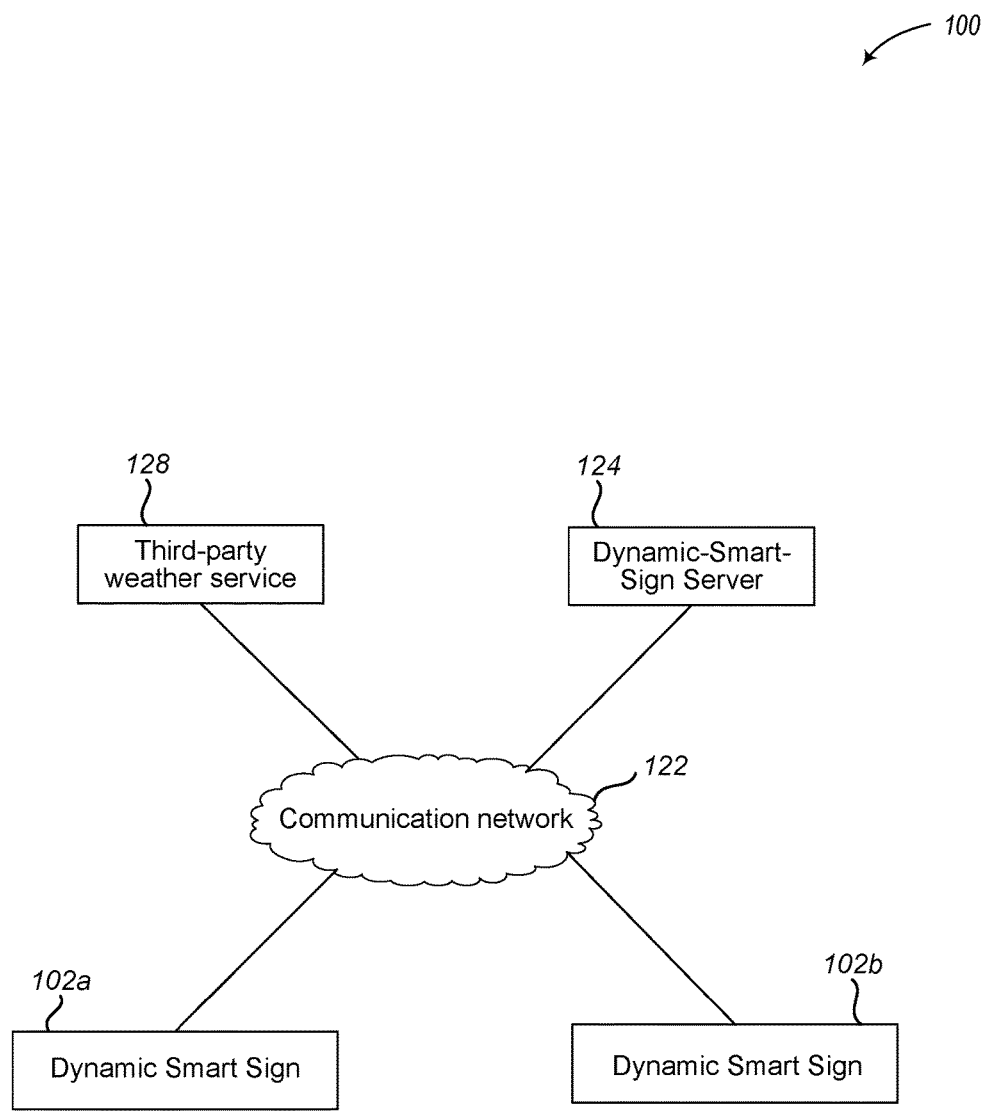
FIG. 1 illustrates a context diagram of an environment where a dynamic smart sign communicates with a dynamic-smart-sign server to dynamically adjust content displayed on the smart sign and to dynamically modify the display settings of the dynamic smart sign in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The terms "smart sign," dynamic smart sign," "electronic display sign," or "sign" refer to a display device that can display content and adjust its own device setting based on environmental data and conditions. Smart signs may be standalone devices or they may be combined with other electronic devices, and they may be employed in a variety of different situations, settings, or environments. For example, in some embodiments, smart signs may include freestanding or wall hanging smart signs used in malls, stores, airports, stadiums, arenas, sporting venues, zoos, amusement parks, hotel lobbies, cruise ships, retail shops, or other locations where information is provided to people. In some other embodiments, the smart signs may be utilized in other electronic devices, such as, but not limited to, a television in a hotel room or cruise-ship cabin, a head unit in an automobile, a heads-up display in an airplane seat, or other electronic devices.

The term "content" refers to information that can be displayed on a smart sign. Content may include visual content, such as, but not limited to, text, graphics, symbols, video, or other information that is provided to a viewer on the smart sign. In some embodiments, the content may also include audio content.

FIG. 1 illustrates a context diagram of an environment where a dynamic smart sign communicates with a dynamic-smart-sign server to dynamically adjust content displayed on the dynamic smart sign and the display settings of the dynamic smart sign in accordance with embodiments described herein. Environment 100 includes dynamic smart signs 102a-102b, dynamic-smart-sign server 124, and a third-party weather service 128.

The dynamic smart signs 102a-102b obtain a variety of different environmental data from multiple different third-party sources to modify the content being displayed by the respective smart signs or to adjust the display settings of the respective smart signs themselves, or both. Each dynamic smart sign 102 utilizes the third-party environmental data to generate display change conditions specific for that respective smart sign, which are in turn used to modify displayed content and display settings of the respective smart sign. The environmental data is specific to each dynamic smart sign 102, which results in each dynamic smart sign 102 individually determining how to modify its displayed content and how to adjust its own display settings.

The dynamic smart signs 102 do not receive the environmental data from photo sensors, thermometers, or other physical sensors or components that are integrated into or communicate directly with the respective smart signs. Rather, the environmental data is received from third-party sources that are remote from the smart signs themselves. As a result, dynamic smart signs 102 are not reliant on internal or external physical sensors or components to provide the environmental data.

Examples of environmental data include, but are not limited to, time of day at the smart sign, the physical location and orientation of the smart sign, the positioning of the sun relative to the smart sign, the positioning of objects in the proximity of the smart sign, current or forecast weather conditions, or other third-party information that may indicate what environmental conditions or factors are affecting the viewability of the content displayed on the dynamic smart sign 102.

In various embodiments, each dynamic smart sign 102 receives the environmental data from the dynamic-smart-sign server 124 or the third-party weather service 128, or other third-party sources (not illustrated), or any combination thereof. The dynamic smart sign 102 can also receive content from the dynamic-smart-sign server 124. In various embodiments, the dynamic-smart-sign server 124 collects all of the environmental data for each separate dynamic smart sign 102 from third-party sources and forwards it to each respective dynamic smart sign 102. In this way, each separate dynamic smart sign 102 generates its own display change conditions and how to modify its displayed content and its display settings.

In some embodiments, the dynamic-smart-sign server 124 utilizes the received environmental data to generate the display change conditions for each separate dynamic smart sign 102. The dynamic-smart-sign server 124 then provides the generated display change conditions to each respective dynamic smart sign 102, where each dynamic smart sign 102 uses its respective display change conditions to determine how to modify its displayed content and its own display settings.

In other embodiments, the dynamic-smart-sign server 124 utilizes the generated display change conditions itself to modify the content to be displayed on each respective dynamic smart sign 102. The dynamic-smart-sign server 124 then provides the modified content to the respective dynamic smart signs 102 for display. The dynamic-smart-sign server 124 can also utilize the generated display change conditions to determine what display settings of each respective dynamic smart sign 102 are to be modified. The dynamic-smart-sign server 124 provides instructions to each respective dynamic smart sign 102 on how to modify its respective display settings accordingly. Therefore, the dynamic smart sign 102 or the dynamic-smart-sign server 124, or a combination thereof, employs embodiments described herein.

Each dynamic smart sign 102 communicates with the dynamic-smart-sign server 124 via communication network 122. Similarly, in some embodiments, the dynamic smart signs 102 can communicate with the third-party weather service 128, other third-party-environmental-data sources (not illustrated), or other computing devices (not illustrated) via communication network 122. The communication network 122 may be configured to couple various computing devices to transmit data from one or more devices to one or more other devices. The communication network 122 includes various wired or wireless networks that may be employed using various forms of communication technologies and topologies, such as, but not limited to, cellular networks, mesh networks, or the like.

Figure 2:
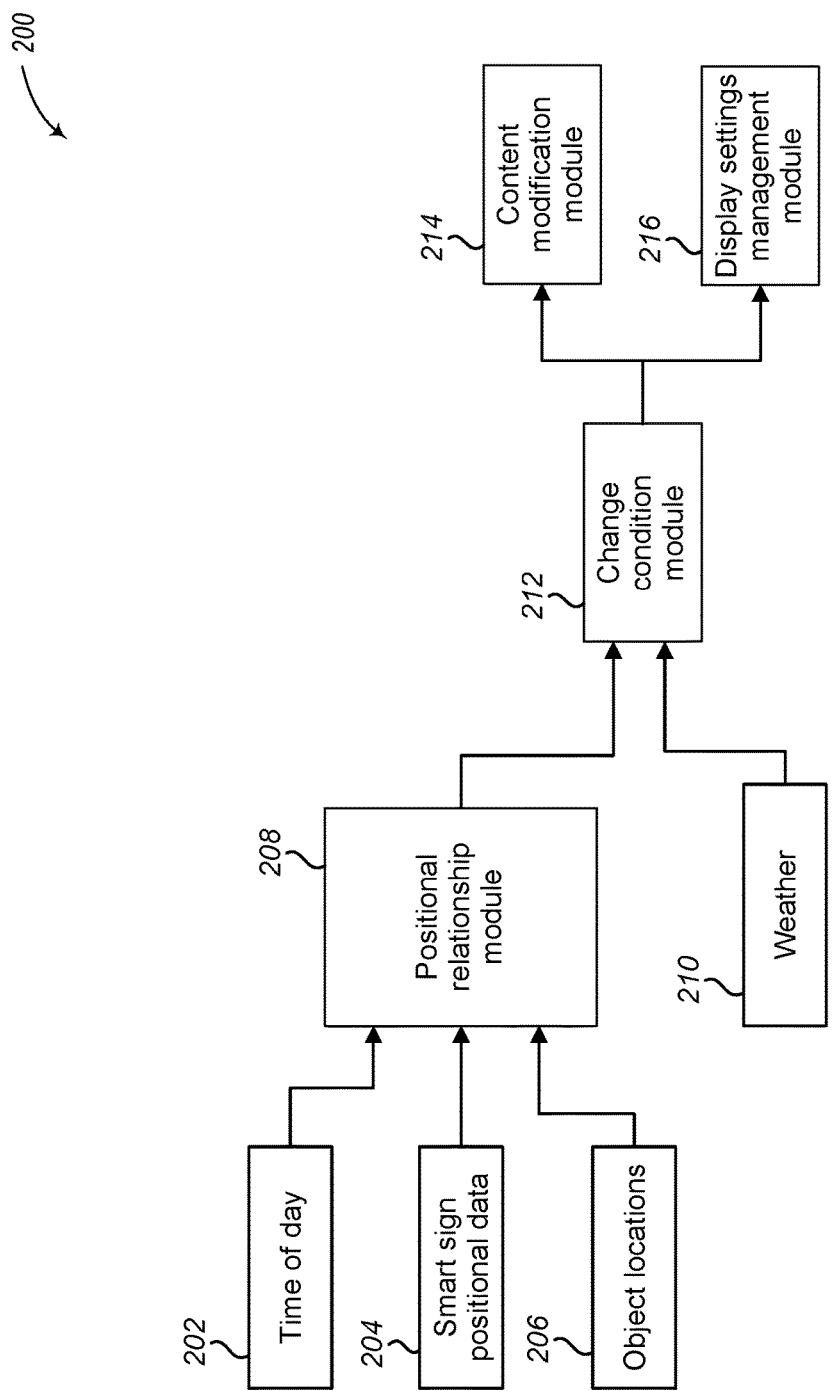
FIG. 2 is a block diagram illustrating the utilization of third-party data to modify content and display settings of a dynamic smart sign in accordance with embodiments described herein.

FIG. 2 is a block diagram illustrating the utilization of third-party data to modify content and display settings for a dynamic smart sign in accordance with embodiments described herein. In various embodiments, example 200 includes a positional relationship module 208, a change condition module 212, a content modification module 214, and a display settings management module 216.

The positional relationship module 208 utilizes a plurality of environmental data to determine the positional relationship of the sun and one or more objects relative to a smart sign, such as dynamic smart sign 102. This environmental data includes a time of day 202, smart sign positional data 204, and object locations 206. The smart sign positional data includes a physical location of the smart sign on the Earth, as well as a cardinal direction of the display screen of the smart sign.

The positional relationship module 208 utilizes the time of day 202 and the smart sign positional data 204 to determine a current position of the sun relative to the smart sign, including a relationship of the sun relative to the display direction of the smart sign. For example, the smart sign positional data 204 may indicate the smart sign is located in Seattle, Wash. and is facing due west, and the time of day 202 may indicate that it is 9:00 am local time, or 9:00 am Pacific Standard Time. Utilizing this information, the positional relationship module 208 can determine that the sun is substantially behind the smart sign, which could result in a viewer standing in front of the sign unable to see the sign due to the glare and intensity of the sun coming over the sign towards the viewer.

Similarly, the positional relationship module 208 determines the positional relationship of objects that are in proximity to the smart sign 102 and may impact how content is being viewed. For example, the object locations 206 may indicate that the smart sign is hanging 1.5 meters off the ground on a wall that is 3 meters high. Utilizing this information, along with the positional relationship between the sun and the smart sign, the positional relationship module 208 may determine that the wall will block or at least partially obstruct the sunlight from the smart sign and the viewer, reducing the negative impacts of the sun's glare on a viewer. In another example, assume that the time of day 202 changes to 4:00 pm local time. At this time, the sun will be behind the viewer and the wall will not block any of the sunlight, which can result in increased glare reflecting off the smart sign. These examples are further illustrated in FIG. 3.

The change condition module 212 utilizes the positional relationships determined by the positional relationship module 208 and weather 210 to generate one or more display change conditions. In various embodiments, the weather 210 includes the current weather conditions or the forecast of future weather conditions at or near the smart sign. The weather conditions may include a temperature, cloud cover, precipitation, etc. The display change conditions indicate one or more characteristics associated with the environmental conditions that could impact how a viewer is viewing the content displayed on the smart sign and how the content or the smart sign's display settings can be modified to improve viewability of the displayed content. For example, if the weather 210 indicates that it is cloudy, then there may be less glare on the smart sign, similar to the example above where the wall was blocking the sunlight at 9:00 am.

The content modification module 214 modifies the content displayed by the smart sign based on the display change conditions generated by the change condition module 212. In some embodiments, the content modification module adds content to the currently displayed content, replaces the currently displayed content with other content, or modifies a characteristic of the displayed content. For example, the content may be modified to include pictures of clouds when it is cloudy, take on a water-like visual characteristic if it is raining, etc. In at least one embodiment, the content modification module 214 may adjust the content from being only visual content to include audio content. For example, if there is too much glare on a display screen of the smart sign, the visual information in the displayed content may be projected through speakers to make it audible. Although not illustrated, in some embodiments, the content modification module 214 utilizes the weather 210 independent of the positional relationships generated by the positional relationship module 208.

The display setting management module 216 modifies at least one display setting of the smart sign based on the display change conditions generated by the change condition module 212. In various embodiments, the display setting management module 216 modifies the brightness or the contrast of a display screen of the smart sign. For example, if the display change conditions indicate that there is a dark shadow over the display screen, such as by a wall or a cloud, as described above, then the brightness of the display screen can be decreased. In some embodiments, the display setting management module 216 may include managing a motor that can alter the orientation or positioning of the smart sign based on the display change conditions. For example, the motor can be instructed to turn the smart sign so that the glare from the user is reduced from its current position.

It should be recognized that the above examples are for illustration purposes, and other types of environmental data from third-party sources may be utilized to modify the content displayed by a dynamic smart sign and to adjust the display settings of the dynamic smart sign itself.

Figure 3:
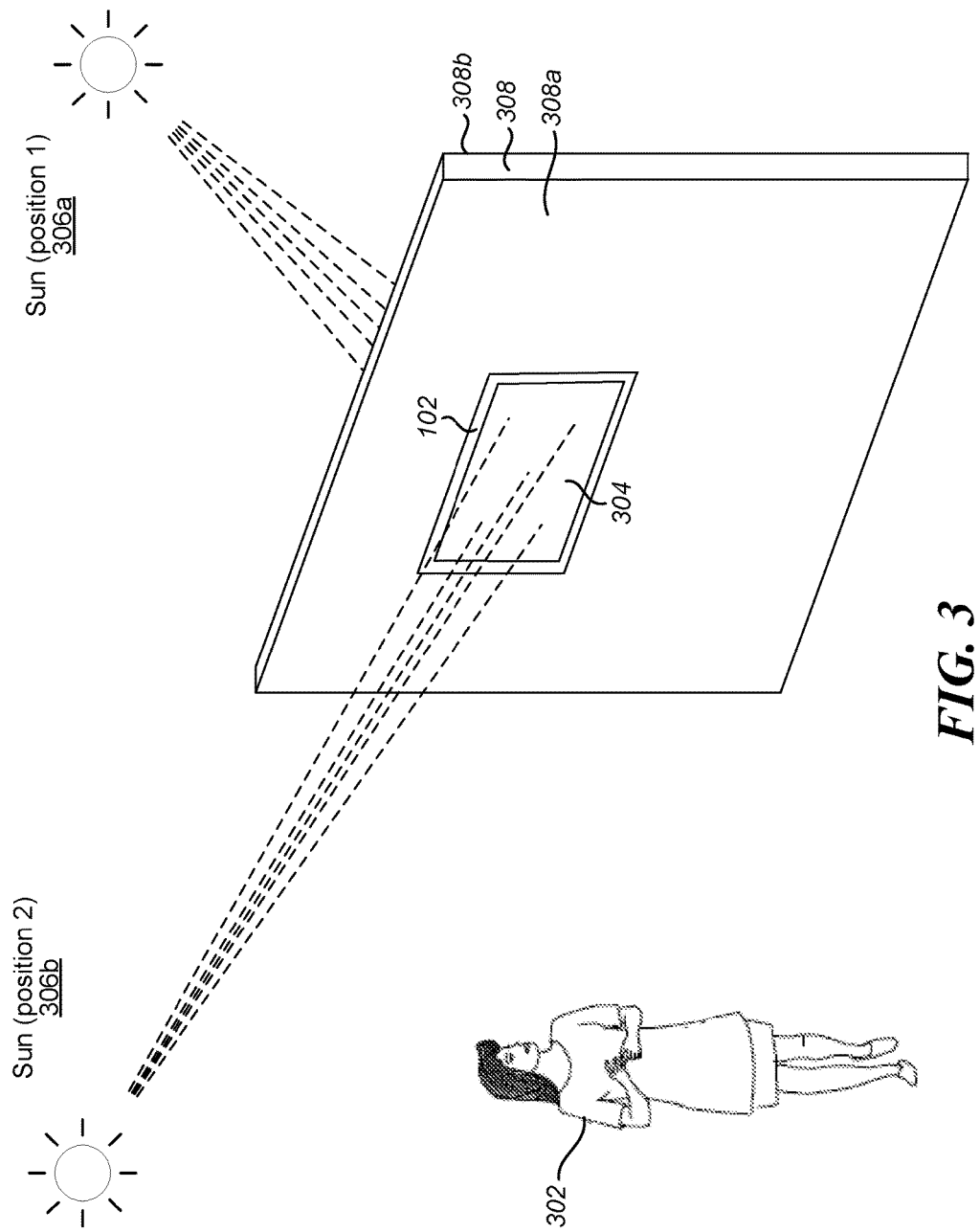
FIG. 3 shows a use case example of an environment that contains a dynamic smart sign that is utilizing third-party data to modify content and display settings of the dynamic smart sign in accordance with embodiments described herein.

FIG. 3 shows a use case example of an environment that contains a dynamic smart sign that is utilizing third-party data to modify content and display settings of the dynamic smart sign in accordance with embodiments described herein. In this illustration a dynamic smart sign 102 is hanging on a front side 308a on a wall 308. Viewer 302 is standing in front of the dynamic smart sign 102 so that she can view a display screen 304 of the dynamic smart sign 102. By employing embodiments described herein, the dynamic smart sign 102 can modify the content displayed on the dynamic smart sign 102 and modify the display settings of the dynamic smart sign 102 based on third-party environmental data.

For example, the environmental data received from the third-party sources may indicate that the display direction of the display screen 304 of the dynamic smart sign 102 is facing due west and that there is a wall 308 opposite the display direction of the display screen 304. At a first time, the current time of day may indicate that the sun is at position_1 (illustrated as sun 306a). At this point in time, the sunlight from the sun 306a is beamed onto a backside 308b of the wall 308, resulting in the wall 308 blocking most of the direct sunlight from the sun 306a. As a result, the dynamic smart sign 102 can generate display change conditions based on this environmental information to modify the displayed content or to change the display settings of the dynamic smart sign 102.

As mentioned herein, the dynamic smart sign 102 may obtain updated or new environmental data at various different times. In various embodiments, the dynamic smart sign 102 may check for changed environmental data periodically, randomly, or at predetermined times, or it may be provided to the dynamic smart sign 102 when it changes. For example, at a later time in the day, the sun has tracked across the sky and is now at position_2 (illustrated as sun 306b). At this point in time, the sunlight from the sun 306b is hitting the front side 308a of the wall 308 and the display screen 304 of the dynamic smart sign 102, which can create unwanted glare reflecting off the dynamic smart sign 102 and at the viewer 302. As a result, the dynamic smart sign 102 can generate display change conditions based on this changed environmental information to modify the displayed content or to change the display settings of the dynamic smart sign 102, as described herein.

It should be recognized that the example shown in FIG. 3 is for illustrative purposes and is not to be exhaustive or limiting in any way.

The operation of certain aspects of the disclosure will now be described with respect to FIGS. 4 and 5. In at least one of various embodiments, processes 400 and 500 described in conjunction with FIGS. 4 and 5, respectively, may be implemented by or executed on one or more computing devices, such as dynamic smart sign 102 or dynamic-smart-sign server 124, or a combination thereof.

Figure 4:
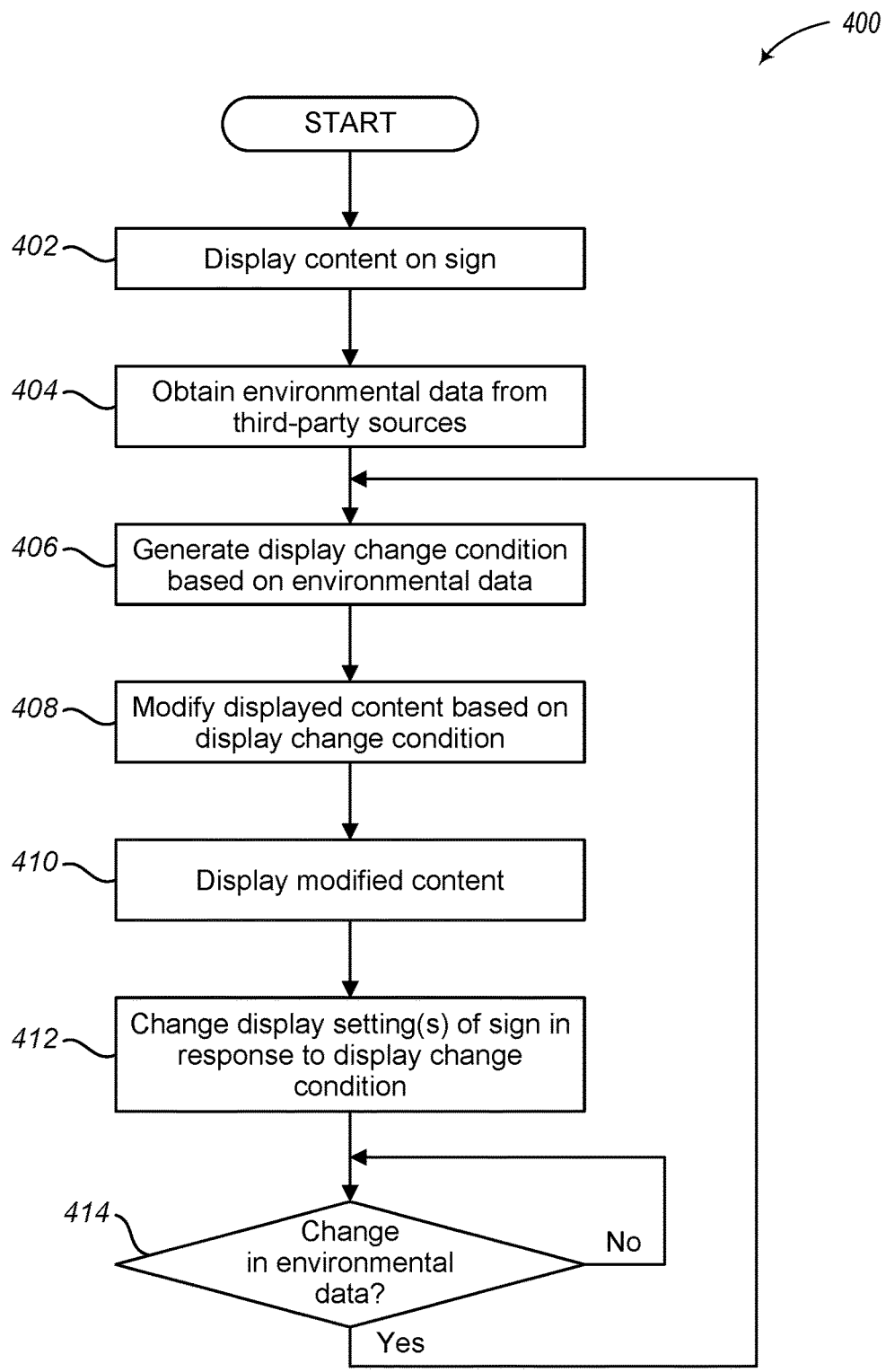
FIG. 4 illustrates a logical flow diagram generally showing one embodiment of an overview process for dynamically modifying displayed content and display settings of a dynamic smart sign based on environmental data in accordance with embodiments described herein.

FIG. 4 illustrates a logical flow diagram generally showing one embodiment of an overview process for dynamically modifying displayed content and display settings of a smart sign based on environmental conditions in accordance with embodiments described herein.

Process 400 begins, after a start block, at block 402, where content is displayed on a smart sign, such as dynamic smart sign 102. In some embodiments, the content is stored on the smart sign. In other embodiments, the content is provided to the smart sign by a dynamic-smart-sign server 124 or some other computing device. The content that is initially displayed on the smart sign is default content for the smart sign. For example, the default content may be a map, store or restaurant information, advertisements, or other content. In various embodiments, the content is provided to the display device of the smart sign to cause the display device to render the content.

Process 400 proceeds to block 404, where environmental data is obtained from one or more third-party sources. As described herein, the environmental data may be a time of day, current or future weather conditions, positional data of the smart sign, positional data of other objects in the vicinity of the smart sign, or other information. Much of the environmental data is obtained from third-party sources that are remote from the smart sign, but some data, such as the time of day, may be maintained locally on the smart sign. Similarly, in some embodiments, the positional data of the objects may be determined based on ultrasound or other proximity detectors. In other embodiments, the positional data of the objects may be input by an administrator. In various embodiments, however, the environmental data does not include data from sensors or physical components that measure the weather or lighting conditions at the smart sign.

Process 400 continues at block 406, where one or more display change conditions is generated based on the obtained environmental data, which is described in more detail below in conjunction with FIG. 5. Briefly, however, the display change conditions are generated based on a combination of the positional relationships between the smart sign, the sun, and other objects and the current weather at the smart sign.

Process 400 proceeds next to block 408, where the displayed content is modified based on the display change condition. In various embodiments, the displayed content may be changed by adding other content to the displayed content, replacing the displayed content with other content, or changing a visual characteristic of the displayed content, as described herein.

Process 400 continues next at block 410, where the modified content is displayed on the smart sign. In various embodiments, the modified content is provided to the display device of the smart sign to cause the display device to render the modified content, similar to what is described above in conjunction with block 402.

Process 400 proceeds to block 412, where one or more display settings of the smart sign are changed in response to the display change condition. In various embodiments, the brightness, contrast, or other display characteristics of the display screen of the smart sign may be adjusted based on the display change conditions. For example, if the display change conditions indicate that the sun is blocked by a wall or clouds or that it is nighttime, then the brightness may be reduced. However, as time progresses, the sun may no longer be blocked and the brightness may be increased. It should be recognized that one or more display settings may be modified alone or in combination based on the display change conditions.

Process 400 continues to decision block 414, where a determination is made whether there is a change to the environmental conditions at the smart sign based on changes in the environmental data. In some embodiments, the smart sign may receive updated or new environmental data from the third party sources periodically, at predetermined times, randomly, or when the environmental data changes. For example, the sun's position relative to the smart sign changes every few minutes, which can alter the visual characteristics of the displayed content to a viewer. In another example, the weather may change, such as incoming clouds, which may also impact the visual characteristic of the displayed content. As a result, the content and the display settings of the sign are dynamically modified to accommodate for these changes in real time. In some embodiments, the smart sign can identify trends in previously received environmental data to predict and anticipate future changes so that the content and the display settings can be changed prior to or as such environmental changes occur. If there are changes in the environmental data, process 400 loops to block 406 to generate display change conditions based on the changed environmental data; otherwise, process 400 loops to decision block 414 to continue to check for changes or updates in the environmental data.

Figure 5:
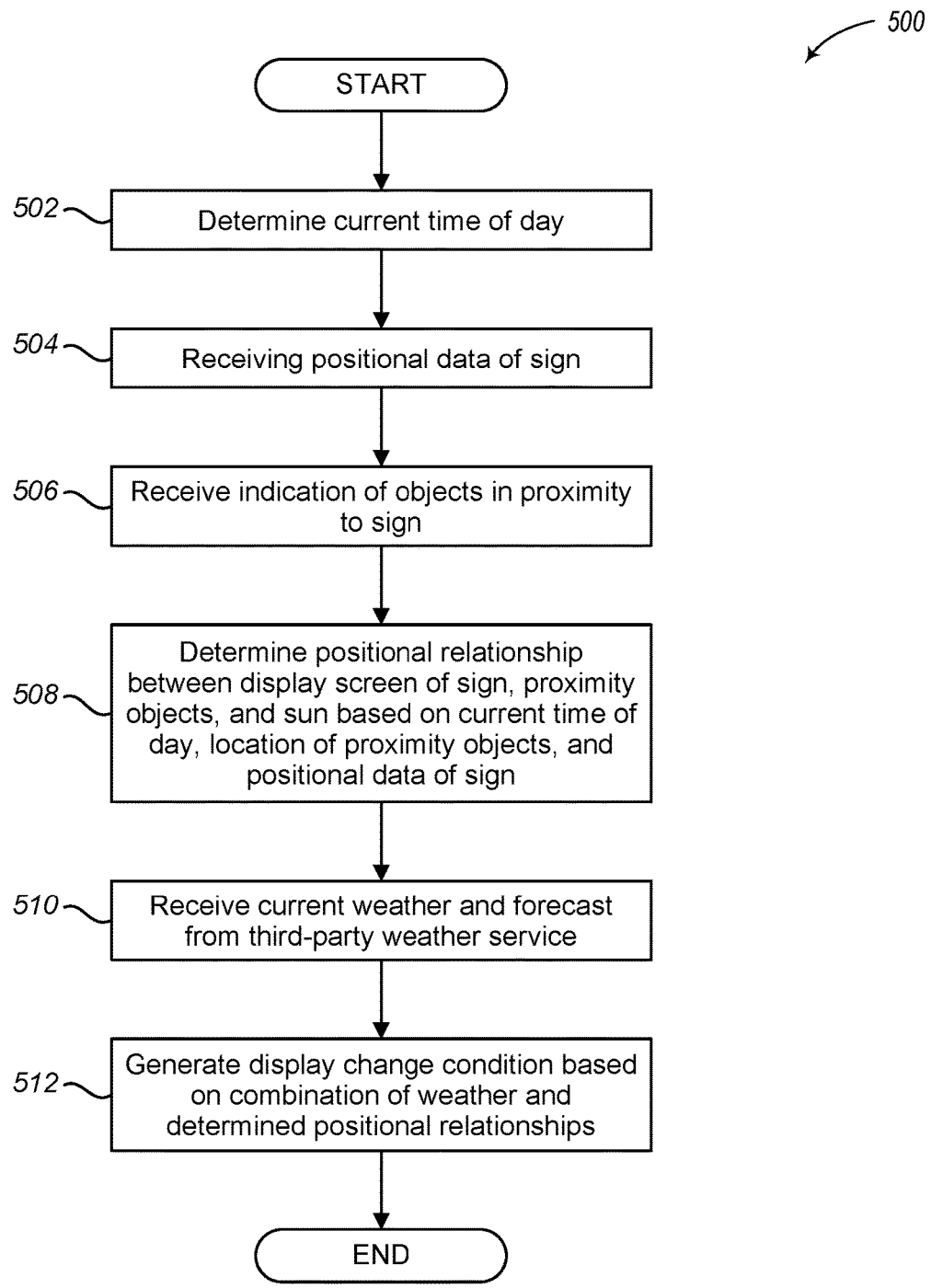
FIG. 5 illustrates a logical flow diagram generally showing one embodiment of a process for generating a change condition based on third-party environmental data in accordance with embodiments described herein.

FIG. 5 illustrates a logical flow diagram generally showing one embodiment of a process for generating a change condition based on third-party environmental data in accordance with embodiments described herein.

Process 500 begins, after a start block, at block 502, where a current time of day at the smart sign is determined. In some embodiments, the smart sign includes an internal clock that maintains the time of day. In other embodiments, the smart sign requests the current time from the dynamic-smart-sign server 124 or some other computing device. In various embodiments, the current time of day includes the current hour and minute along with the current day, month, and year, so that the position of the sun relative to the smart sign can be determined. In some other embodiments, a third-party source may provide the sun's current position relative to the smart sign rather than the current time of day.

Process 500 proceeds to block 504, where positional data of the sign is received. The positional data defines a physical location of the smart sign and which way it is facing. The positional data may be input by an administrator of the smart sign or it may be determined using GPS and compass readings. In various embodiments, the positional data includes a geographical location of the smart sign and an orientation of the smart sign. The geographical location can include latitude and longitude coordinates or other global positioning coordinates. The orientation of the smart sign may be the cardinal direction of the display screen of the smart sign.

Process 500 continues at block 506, where an indication of one or more objects in proximity to the sign is received. These objects can include pillars, walls, buildings, canopies, awnings, mountains, trees, lakes, reflective surfaces, or other obstacles that may alter how sunlight shines off the smart sign, which could impact the visual representation of the content displayed by the smart sign. In various embodiments, the location and size of these objects may be input by an administrator of the smart sign or they may be determined using ultrasound or other proximity detectors.

Process 500 proceeds next to block 508, where positional relationships are determined between the display screen of the smart sign, the proximity objects, and the sun. In various embodiments, the positional relationships are determined based on the location or positioning of the smart sign, the proximity objects, and the sun. These relationships are utilized to calculate the line-of-sight angle from the sun to the display screen of the smart sign, and whether any of the proximity objects are blocking the sunlight or casting shadows on the display screen of the smart sign.

Process 500 continues next at block 510, where a current weather condition or weather forecast is received from a third-party weather service. The current weather may include a current temperature, current cloud cover, current precipitation, or other real-time weather-related information. Similarly, the weather forecast may include a predicted temperature, predicted cloud cover, predicted precipitation, or other predicted weather-related information.

Process 500 proceeds to block 512, where a display change condition is generated based on a combination of the received weather information and the determined positional relationships. In some embodiments, the display change condition may indicate an estimated light intensity or glare from the sun on the display screen of the smart sign. In other embodiments, the display change conditions may indicate an estimate of how the light intensity or glare has changed over time or is projected to change in the future. In this way, the smart sign can anticipate changes in the environmental conditions surrounding the smart sign and modify the content or adjust the display setting before or as such changes actually occur.

After block 512, process 500 returns to a calling process to perform other actions.

It should be understood that the embodiments described in the various flowcharts may be executed in parallel, in series, or in a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Figure 6:
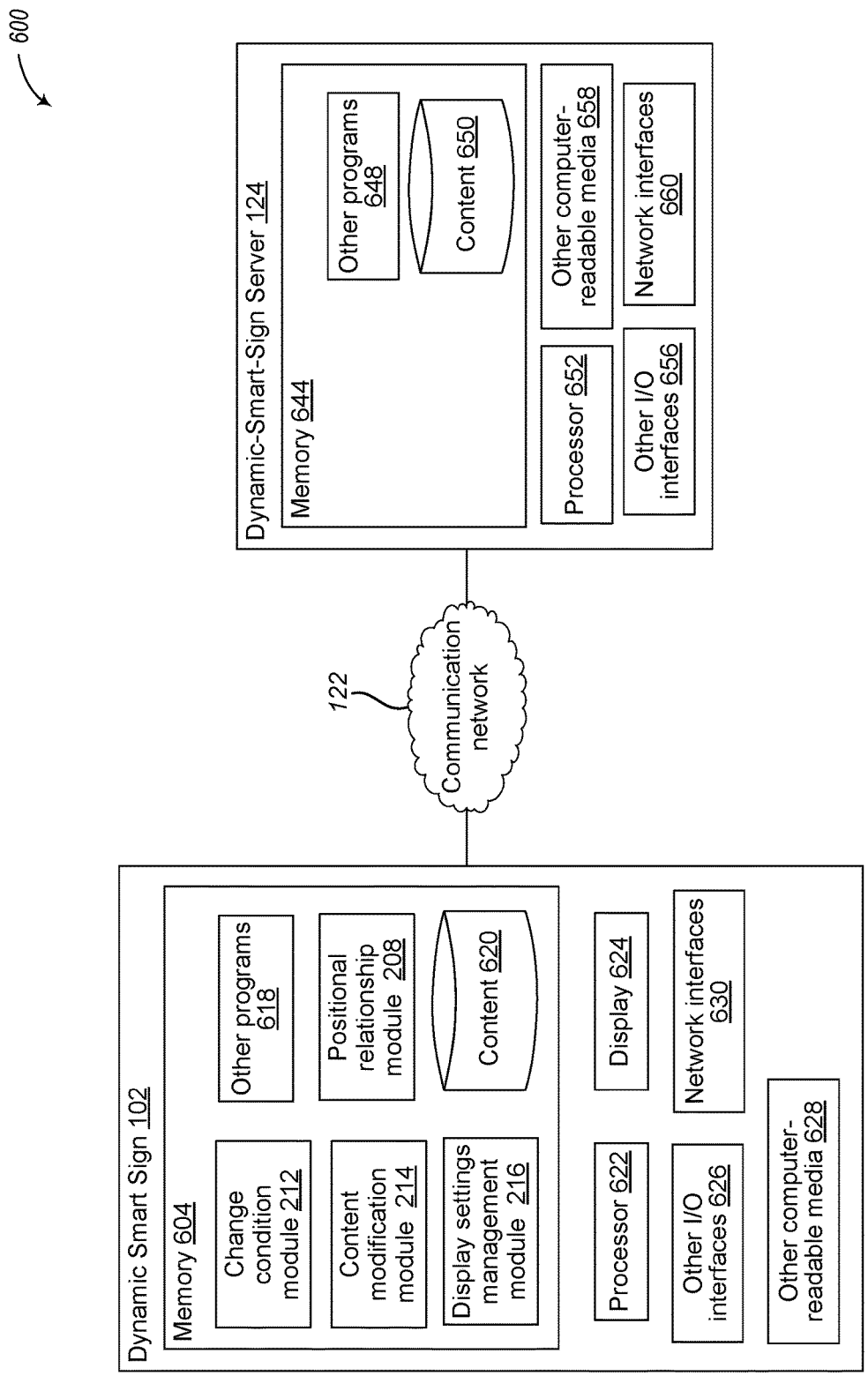
FIG. 6 shows a system diagram that describes one implementation of computing systems for implementing embodiments described herein.

FIG. 6 shows a system diagram that describes one implementation of computing systems for implementing embodiments described herein. System 600 includes a dynamic smart sign 102 and a dynamic-smart-sign server 124.

One or more special-purpose computing systems are used to implement dynamic smart sign 102 to generate or receive display change conditions based on third-party environmental data. The dynamic smart sign 102 can modify content it is displaying and adjust its own display settings based on the display change conditions. Accordingly, various embodiments described herein may be implemented in software, hardware, firmware, or in some combination thereof. Dynamic smart sign 102 includes memory 604, processor 622, display 624, I/O interfaces 626, other computer-readable media 628, and network interface 630.

Processor 622 includes one or more processing devices that execute instructions to perform actions, including at least some embodiments described herein. In various embodiments, the processor 622 may include one or more central processing units (CPUs).

Memory 604 may include one or more various types of non-volatile and/or volatile storage technologies. Examples of memory 604 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 604 may be utilized to store information, including computer-readable instructions that are utilized by processor 622 to perform actions, including at least some embodiments described herein.

Memory 604 may have stored thereon various modules, such as a change condition module 212, a content modification module 214, a positional relationship module 208, a display setting management module 216, or other programs 618. The positional relationship module 208 generates one or more positional relationships between a display direction of the dynamic smart sign 102, the sun, and objects that are in proximity to the dynamic smart sign 102, as described above. The change condition module 212 generates a display change condition based on the positional relationships generated by the positional relationship module 208 and the current weather conditions or forecast conditions received from a third-party weather service, as described above. The content modification module 214 modifies the content displayed by the dynamic smart sign 102, as described above. And the display setting management module 216 modifies at least one display setting of the display 624, as described above.

Memory 604 may also store content 620, which may include various different types of content to be displayed on the display 624.

Display 624 is a display device capable of rendering content to a user. The display 624 may be a liquid crystal display, light emitting diode, or other type of display device, and include a touch sensitive screen capable of receiving inputs from a user's hand, stylus, or other object. Various different display settings of the display 624, such as brightness and contrast, may be managed by the display settings management module 216.

I/O interfaces 626 may include interfaces for various other input or output devices, such as audio interfaces, other video interfaces, USB interfaces, physical buttons, or the like. Other computer-readable media 628 may include other types of stationary or removable computer-readable media, such as removable flash drives, external hard drives, or the like. Network interfaces 630 are configured to communicate with other computing devices, such as dynamic-smart-sign server 124 via the communication network 122.

One or more computing systems are used to implement the dynamic-smart-sign server 124 to obtain environmental data from third-party sources to represent or define the environmental conditions at the dynamic smart sign 102. In various embodiments, the dynamic-smart-sign server 124 forwards the environmental data to the dynamic smart sign 102. In other embodiments, the dynamic-smart-sign server 124 can utilize the environmental data to perform further actions to employ embodiments as described herein, similar to what is described above with respect to the dynamic smart sign 102. Accordingly, various embodiments described herein may be implemented in software, hardware, firmware, or in some combination thereof. The dynamic-smart-sign server 124 includes memory 644, one or more processors 652, I/O interfaces 656, other computer-readable media 658, and network interface 660.

Processor 652 includes one or more processing devices that execute instructions to perform actions. In various embodiments, the processor 652 may include one or more central processing units (CPUs).

Memory 644 may include one or more various types of non-volatile and/or volatile storage technologies. In some embodiments, memory 644 may employ storage technology similar to what is described above for memory 604. Memory 644 may be utilized to store information, such as computer-readable instructions that are utilized by processor 652 to perform actions, including at least some embodiments described herein.

Memory 644 may have stored thereon various programs 648. The programs 648 can include operating system programs, applications, or other programs. Although not illustrated, the memory 644 may include one or more modules, similar to the positional relationship module 208, the change condition module 212, the content modification module 214, or the display settings management module 216, to employ embodiments similar to what is described above with the dynamic smart sign 102. For example, in some embodiments, the dynamic-smart-sign server 124 utilizes the received environmental data to generate display change conditions for the dynamic smart sign 102. In at least one embodiment, the dynamic-smart-sign server 124 generates content and determines display settings for the dynamic smart sign 102 based on the display change conditions. The dynamic-smart-sign server 124 can provide the environmental data, the display change conditions, or the generated content and display settings to the dynamic smart sign 102 via communication network 122.

Memory 644 may also have stored thereon content 650, which includes various different types of content that can be displayed on the dynamic smart sign 102. In some embodiments, the content 650 can also store the environmental data received from the third-party sources.

I/O interfaces 656 may include interfaces for various other input or output devices, such as audio interfaces, display interfaces, other video interfaces, USB interfaces, or the like. Other computer-readable media 658 may include other types of stationary or removable computer-readable media, such as removable flash drives, external hard drives, or the like. Network interfaces 660 are configured to communicate with other computing devices, such as dynamic smart sign 102 via the communication network 122

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a memory that stores instructions;
a display device that displays content;
a processor that executes the instructions from the memory to perform actions, the actions including:
providing content to the display device to cause the display device to render the content;
determining a current time of day for the display device;
receiving positional data of the display device, including a display direction of the display device;
receiving an indication of objects within a predetermined distance from the display device;
determining positional relationships of the sun and the objects relative to the display direction of the display device based on the current time of day, the positional data of the display device, and a position of the objects within the predetermined distance from the display device;
receiving a current weather condition at the display device from a third-party weather service;
generating a display change condition based on a combination of the current weather condition and the determined positional relationships;
modifying the displayed content based on the display change condition;
providing the modified content to the display device to cause the display device to render the modified content; and
initiating a signal that controls the display device to change at least one of its display settings in response to the display change condition.

2. The system of claim 1, wherein the objects within the predetermined distance from the display device are positioned between the display device and the sun at the current time of day.

3. The system of claim 1, wherein initiating the signal that controls the display device to change the at least one display setting includes:
determining a change to a brightness setting of the display device; and
sending the signal to control a brightness of the display device based on the determined changed brightness setting.

4. The system of claim 1, wherein initiating the signal that controls the display device to change the at least one display setting includes:
determining a change to a contrast setting of the display device; and
sending the signal to control a contrast of the display device based on the determined changed contrast setting.

5. The system of claim 1, wherein the processor executes the instructions to perform further actions, the further actions comprising:
initiating a motor to modify the display direction of the display device based on the display change condition.

6. The system of claim 1, wherein modifying the displayed content further comprises:
adding other content to the displayed content to illustrate the current weather condition.

7. The system of claim 1, wherein the processor executes the instructions to perform further actions, the further actions comprising:
receiving a weather forecast at the display device from the third-party weather service; and
wherein modifying the displayed content includes adding other content to the displayed content to illustrate the weather forecast.

8. The system of claim 1, wherein the display change condition is generated independent of physical sensors associated with the display device.

9. A system, comprising:
a smart-sign server; and a smart sign that communicates with the smart-sign server over a communication network;

wherein the smart-sign server performs actions, including:

determining a current position of the sun relative to the smart sign;

receiving positional data of the smart sign, including a display direction of the smart sign;

determining positional relationships of the sun relative to the display direction of the smart sign based on the current position of the sun and the positional data of the smart sign;

receiving a weather condition at the smart sign from a third-party weather service; and generating a display change condition based on a combination of the weather condition and the determined positional relationships; and wherein the smart sign performs actions, including:

displaying content to a display screen of the smart sign;

receiving the display change condition from the smart-sign server over the communication network;

modifying the displayed content based on the display change condition; and modifying at least one display setting of the display screen of the smart sign in response to the display change condition.

10. The system of claim 9, wherein the smart-sign server performs further actions, comprising:

receiving positional data of objects in proximity to the smart sign; and determining the positional relationships of the sun relative to the display direction of the smart sign based on the current position of the sun, the positional data of the smart sign, and the positional data of the objects in proximity to the smart sign.

11. The system of claim 10, wherein the objects in proximity to the smart sign are positioned between the display device and the sun at the current time of day.

12. The system of claim 9, wherein the smart sign performs further actions, comprising:

modifying a brightness setting of the display screen of the smart sign based on the display change condition.

13. The system of claim 9, wherein the smart sign performs further actions, comprising:

modifying a contrast setting of the display screen of the smart sign based on the display change condition.

14. The system of claim 9, wherein the smart sign performs further actions, comprising:

initiating a motor to change an orientation of the display screen of the smart sign based on the display change condition.

15. The system of claim 9, wherein modifying the displayed content further comprises:

changing at least one visual characteristic of the displayed content to represent the weather condition.

16. A method, comprising:

providing content to a display device to be displayed by the display device;

determining a current position of the sun relative to the display device;

determining an orientation of the display device relative to the sun;

receiving a weather condition at the display device from a third-party weather service;

generating a display change condition based on a combination of the weather condition and the determined current position of the sun and the orientation of the display device relative to the sun;

modifying the displayed content based on the display change condition; and modifying at least one display setting of the display device in response to the display change condition.

17. The method of claim 16, wherein modifying the displayed content includes sending the modified content to the display device to be rendered by the display device.

18. The method of claim 16, wherein modifying the at least one display setting of the display device includes sending an instruction to the display device to command the display device to change a brightness of the display device.

19. The method of claim 16, further comprising:

providing the display change condition to the display device to cause the display device to modify the displayed content based on the display change condition and to modify the at least one display setting of the display device in response to the display change condition.

20. The method of claim 16, wherein the display change condition is generated independent of physical sensors on the display device.

* * * * *